Patented Apr. 26, 1938

2,115,055

UNITED STATES PATENT OFFICE 2,115,055

COMPOSITION OF HALOGEN CONTAINING RUBBER DERIVATIVES AND LEAD COMPOUNDS

Herbert A. Winkelmann, Chicago, Ill., assignor to Marbon Corporation, a corporation of Delaware No Drawing. Application December 20, 1935, Serial No. 55,413

14 Claims. (Cl. 106—23)

This invention relates to new compositions particularly adapted for the production of milled, molded, tubed and calendered articles of manufacture. More specifically it relates to compositions of halogen containing rubber derivatives and lead compounds.

Saturated and nearly saturated halogen containing rubber derivatives are so unstable towards heat and mechanical working that when they are milled they decompose with copious evolution of gas, and when molded there is sweating, blowing and loss of strength.

Rubber hydrochloride of 30% chlorine content, when milled on a regulation rubber mill evolves large quantities of hydrogen chloride throughout the milling. The milled product which has been milled for about ten minutes gives on molding for three minutes at 240° F. a black, opaque, moderately stiff mass showing sweating. This mass has a tensile strength of 5300 lbs. per sq. in., an elongation of 10% and a Pusey & Jones penetration or hardness reading of 2. Further heat treatment of the milled product such as obtained by molding it for 30 minutes at 260° F. results in a black, opaque, badly blown and distorted mass, having a tensile strength of 3700 lbs. per sq. in. When the heat treatment is extended to one hour at 260° F. the product obtained is dark brown, brittle, blown and distorted. It is very weak and of low tensile strength. Such are the products obtained from rubber hydrochloride which has been milled about ten minutes with water cooling to reduce the temperature. Longer time of milling results in greater weakness, sweating, etc. Although vigorous heat treatment is not necessary for some uses of rubber hydrochloride, it is important in many uses of molded products that they will stand up under prolonged heat treatment. Furthermore, curing or vulcanizing of rubber hydrohalide compositions is generally carried out through an extended period of heat treatment. Gassing during milling is also a disadvantage, and sweated products are of little value. It is, therefore, important to have some means for retarding the disintegration of halogen containing rubber derivative compositions.

Unsaturated halogen containing rubber derivatives appears to have less tendency to decompose than the saturated or nearly completely reacted compounds. However, the halogen containing rubber derivatives which are so unsaturated that they act similarly to rubber, as for example, rubber hydrochloride of 10% chlorine or rubber chloride of 20% chlorine have the disadvantages of softness, tackiness as well as the numerous disadvantages of rubber such as poor resistance to lubricating oils, gasoline, oxidizing agents such as ozone, etc.

It is an object of this invention to produce nontacky, oil and ozone resistant halogen containing compositions which are homogeneous, strong, dense and relatively stable towards heat.

Another object is to produce rubber hydrochloride compositions which will maintain their high tensile strength throughout extensive heat treatment.

Another object is to provide a halogen containing rubber derivative which remains free of sweat or the exuding of acid, moisture and salts.

Other objects will become apparent on reading the specification.

It has been found that lead and lead compounds when combined with halogen containing rubber derivatives give compositions of superior density, homogeneity and strength, and in many cases tend to maintain these qualities throughout extended heat treatment.

The preferred halogen containing rubber derivatives are the rubber hydrohalides, particularly the rubber hydrochlorides. Such products combine with the lead salts to give products superior in strength, homogeneity and stability to the composition containing the halogenated rubbers. Various types of rubber hydrochloride may be used ranging through the soluble type rubber hydrochloride such as is made with liquefied hydrogen chloride and rubber at around —85° C., and the relatively insoluble type rubber hydrochloride made with gaseous hydrogen chloride and solid rubber at above room temperature. The rubber hydrohalide and rubber halides may be partially or completely saturated. It is generally preferred to use rubber hydrohalides of from 20-31% halogen.

The preferred lead compounds from the point of view of giving mixtures which are readily milled with little or no gassing and which may be molded into substantially undecomposed homogeneous masses free of sweating and blowing are the basic lead compounds, particularly lead carbonate, litharge, and lead hydroxide. It, however, has been discovered, that certain of the lead compounds which are not ordinarily classed as basic or hydrogen chloride reactive will also give compositions which are homogeneous and which maintain their tensile strength through extended heat treatment.

The following examples give the characteristics of certain lead compounds when milled and molded with rubber hydrochloride:

EXAMPLE I

Lead oxides, lead carbonate

Rubber hydrochloride 100 parts by weight and lead oxide (PbO) 10 parts by weight are milled about ten minutes on any type of rubber mill. The mixture mills readily into an intimate solid mass with slight evolution of gas at the start only. The milled mass may be molded into any desired shape. On molding for 3 minutes at 240° F. there is obtained a gray, very stiff, opaque mass showing no evidence of blowing or sweating. The mass has a tensile strength of about 5400 lbs. per square inch, elongation of 10% and a Pusey & Jones penetrometer reading of 10. On molding for 30 minutes at 260° F. there is obtained a pink-gray stiff opaque mass, showing no evidence of blowing but, however, showing heavy sweating. The tensile strength of this mass is about 3600 lbs. per square inch, the elongation about 117% with set of 30 and penetration or hardness reading of 7. On molding for 60 minutes at 260° F. there is slight blowing as well as heavy sweating, but the mass remains moderately stiff, is opaque and has a pink-gray color. The tensile strength is about 3700 lbs. per square inch, elongation about 23% with set of 11 and hardness of about 8. The lead oxide in 10 parts shows fair stabilizing ability in that it retards or nearly prevents the evolution of hydrogen chloride gas on milling, and maintains the tensile strength to a fair degree on extended heat treatment. Increasing the amount of lead oxide from 10 parts to 30 parts results in the hydrogen chloride gas being more effectively absorbed during the milling and prevents sweating even during a 60 minute molding at 260° F. The addition of 5–10 parts F. F. wood rosin aids greatly in maintaining the tensile strength of rubber hydrochloride-lead oxide composition throughout increasing proportions of lead oxide.

Lead carbonate, lead hydroxide and white lead act similarly to litharge (PbO). A composition of rubber hydrochloride 100 parts and $PbCO_3$ 10 parts by weight on milling and molding gives a homogeneous mass having a tensile strength of over 5500 lbs. per square inch, which will be maintained throughout heat treatment of over 1 hour at 260° F. With lead hydroxide a tensile strength of over 6000 pounds is similarly maintained. Lead peroxide ($PbO_2$), and lead sesquioxide ($Pb_2O_3$) have little or no effect on preventing gassing of the rubber hydrochloride during milling, or sweating during molding. Both materials are, however, of some aid in retarding blowing during molding and maintain tensile strength of around 3000–4000 in the composition during heat treatment.

EXAMPLE II

Lead borate

Rubber hydrochloride 100 parts by weight and lead borate 10 parts by weight is milled about ten minutes. The mixture mills readily into an intimate solid mass with slight evolution of gas during the milling. The milled mass may be molded into any shape desired. On molding for three minutes at 240° F. there is obtained a stiff, gray, opaque, homogeneous mass showing no evidence of blowing or sweating. The mass has a tensile strength of about 5950 lbs. per square inch, elongation of 10% and a Pusey & Jones penetrometer reading of 4. On molding for 30 minutes at 260° F. there is obtained a reddish gray, moderately stiff opaque mass, showing no signs of blowing or sweating. This mass has a tensile of 5300 lbs. per square inch, elongation of 15% with set of 10, and a hardness or penetrometer reading of 3. Molding for 60 minutes at 260° F. gives a similar result in appearance to molding for thirty minutes, and the strength is well maintained at about 5150 lbs. per square inch tensile, 13% elongation, with set of 2, and a hardness of 5. Increasing the amount of lead borate from 10 parts to 30 parts has little effect on tensile strength or appearance.

EXAMPLE III (PLASTICIZERS)

Lead linoleate, lead oleate, lead stearate 100 parts of substantially solid rubber hydrochloride of 29% chlorine content is milled with 10 parts by weight of powdered lead stearate for ten minutes on a regulation rubber mill. Gas is evolved throughout the milling. The product is molded at 240° F. for three minutes. A grayish brown, opaque, very soft and flexible product is obtained, showing no evidence of blowing or sweating. It has a tensile strength of 3350 lbs. per square inch, an elongation of 75% with set of 20%, and Pusey & Jones hardness of 20. On heating the milled product in a mold for thirty minutes at 260° F. there is obtained a similar soft product which, however, is slightly blown and shows some sweating. The tensile strength of this product is 1800 pounds, elongation 357%, set 10 and hardness 46. Heat treating the milled product for one hour at 260° F. gives a similar product with tensile of 1440 lbs., elongation 260, set 44 and hardness 55.

Lead oleate behaves similarly to lead stearate, but its tensile strengths are only about ⅓ of the lead stearate compositions. Lead linoleate is similar to lead oleate in behavior on heat treatment, and in strength and characteristics of the products, although its tensile is slightly higher and slightly better maintained throughout heat treatment.

EXAMPLE IV

Lead resinate

The addition of 10 to 30 parts of lead resinate to a rubber hydrochloride composition has little or no effect on retarding gas evolution during milling of the composition. The lead resinate, however, appears to retard heat decomposition to a slight extent and the composition is superior in this respect to straight rubber hydrochloride. A tensile strength of 4000 lbs. was obtained on a composition molded for thirty minutes at 260° F. However, on further heat treatment the product rapidly became brittle and weak. On one hour treatment at 260° F. the composition is badly blown and decomposed.

EXAMPLE V

Lead chloride, lead nitrate, lead sulphate

There is no apparent reason why such materials should heat stabilize rubber hydrohalides, and it is not definitely known that these materials retard the heat disintegration of the rubber hydrohalide. Nevertheless, the addition of such materials to rubber hydrochloride maintains the tensile strength of the composition to some extent throughout extended heat treatment, and from that point of view at least they are heat stabilizers. As might be expected, however, the compounds of lead with a strong acid do not retard gas evolution on milling. The products obtained on molding at 260° F. for 30 minutes and over are blown and show sweating. They are, however, moderately stiff and have unexpected high tensile strength as shown by the following table:

| Material added in 10 parts by weight per 100 parts R-HCl | Tensile strength on product molded | | |
|---|---|---|---|
| | 3' @ 240° F. | 30' @ 260° F. | 60' @ 260° F. |
| Lead chloride | 6600 | 6000 | 6700 |
| Lead sulphate | 5900 | 5700 | 3800 |
| Lead nitrate | 6100 | 3600 | 4100 |

EXAMPLE VI

*Lead sulphide*

The addition of lead sulphide to rubber hydrochloride has little or no effect in preventing gas evolution during milling. Lead sulphide, however, has some very marked influence of the rubber hydrochloride during heat treatment. Blowing is effectively prevented. Sweating is greatly lessened. The composition changes from an opaque, stiff, homogeneous material to a moderately soft material on heating at 260° F. over thirty minutes. The tensile strength of the product appears to vary widely with the time of milling and extent of heat treatment, decreasing considerably with longer milling time and heat treatment. This is markedly shown with 30 parts lead sulphide per 100 parts of rubber hydrochloride. Milling this composition for ten minutes and molding the milled product for three minutes at 240° F. gives a product having a tensile of 6500 lbs., elongation 10, hardness of 4. One hour heat treatment decreases the tensile to 2000 lbs., increases the elongation to 410% and decreases the hardness to 31. The sulphides appear to be distinctly different in their action towards rubber hydrohalides than the other lead compounds.

EXAMPLE VII

*Lead*

Lead dust and rubber hydrochloride (30% chlorine) in the proportion of 10 parts lead to 100 parts rubber hydrochloride by weight are milled for about ten minutes into a homogeneous composition in an ordinary rubber mill. There is evolution of gas from start to finish of the milling which, however, is lessened with increased proportions of lead. The product which is molded at 260° F. for thirty minutes is an opaque, moderately stiff mass in which blowing and sweating is absent. A further 30 minutes of heat treatment at 260° F. results in blowing and sweating, but the composition retains its strength and stiffness. Throughout such heat treatment the tensile strength remains at about 6000 lbs. per square inch, the elongation at 10% and the hardness at from 3 to 5.

Sublimed blue lead, a powdered lead in an extremely fine state of subdivision, gives similar results to the ordinary lead dust. There is, however, a definite increase in the hardness of the compositions as the time of heat treatment increases from 3 minutes to 1 hour. The effect of increasing the proportion of lead to rubber hydrochloride is apparently detrimental to the strength of short time milled and molded products. A composition of 30 parts sublimed blue lead and 100 parts rubber hydrochloride by weight, which has been milled for ten minutes and molded 3 minutes at 240° F. has a tensile strength of 2900 lbs., elongation of 370% and hardness of 13 as compared with a tensile of 6300 lbs., elongation of 10 and hardness of 6 on a similarly milled and molded composition of 10 parts lead and 100 parts rubber hydrochloride. On further heat treatment of 30 minutes at 240° F., however, the 30 parts lead composition has a tensile of 5600 lbs., elongation of 10% and hardness of 5, and maintains this tensile throughout heat treatment of one hour at 240° F. This compares favorably with the 6400 lbs. tensile, 10% elongation, 3 hardness with 30 minute heat treatment at 240° F., and the 6300 tensile, 10% elongation, hardness of 2 for one hour heat treatment at 240° F. obtained with the composition of 10 parts sublimed blue lead and 100 parts rubber hydrochloride.

The principal value of finely divided metallic lead is believed to be in products which must remain hard throughout heat treatment or baking. There is apparently some sort of a reaction between the finely divided lead and the rubber hydrochloride or the evolved hydrogen chloride. Possibly the improved results are due to the presence of lead chloride. However, the mechanism of the action is not definitely known.

*Other lead compounds*

Other lead compounds in 10 parts by weight per 100 parts of rubber hydrochloride maintain tensile strength of around 4000 pounds, or more during heat treatment of one hour at 260° F. are lead sulphocyanate, lead silico fluoride, lead acetate, lead lactate, lead oxalate, lead tartrate, lead hyposulphate, lead chromate.

The proportions of lead compounds to rubber hydrochloride may vary widely. Ordinarily from 10 to 30 parts lead compounds by weight per 100 parts of rubber hydrochloride is sufficient. Below 5 parts the lead compound is of little value. Above 30 parts by weight the lead compound acts more as a filler and the increase in stabilizing effect due to increase in proportion becomes hardly appreciable. With large proportions of lead compounds the tensile strength tends to fall off due to the inability of the rubber hydrochloride to bind large amounts of fillers as strongly as lesser amounts. Various modifications in proportions, fineness of the powdered lead compounds, degree of saturation of the halogen containing rubber derivatives may be made without departing from the spirit of this invention.

The addition of lead compounds, particularly lead oxide and lead carbonate to compositions of rubber hydrohalides and magnesium oxide or magnesium carbonate is of aid in decreasing the brittleness of such compositions. Lead oxide also seems to have some value as an auxiliary curing agent in rubber hydrohalide sulphur compositions. Other advantages and uses of lead compounds in rubber hydrohalide compositions have been hereinbefore mentioned. In general, however, the use of lead compounds with halogen containing rubber derivatives gives improved molded articles of manufacture, the specific advantages varying with the type of lead compound and the type of halogen containing rubber derivative as hereinbefore pointed out.

This application is a continuation in part of my copending application Serial No. 11,665, filed March 15, 1935, now Patent No. 2,046,986.

I claim:

1. A composition comprising an intimate mixture of a rubber hydrochloride, litharge, and magnesium oxide.

2. A composition comprising an intimate mixture of a rubber hydrochloride, litharge, magnesium oxide and sulfur.

3. A composition characterized by high heat stability and lack of brittleness comprising a rubber hydrochloride, a basic lead compound and a basic magnesium compound.

4. A composition comprising a rubber hydrochloride, a basic lead compound, a basic magnesium compound, and sulfur.

5. A molded article of manufacture comprising as an essential ingredient a rubber hydrochloride intimately admixed with a minor proportion of a basic lead compound and a basic magnesium compound.

6. A composition of matter comprising a rubber hydrochloride, a basic heat stabilizer other than a lead compound for said rubber hydrochloride, and a lead compound as a stabilizer acting in conjunction with said other heat stabilizer.

7. A composition of matter comprising a rubber hydrochloride, a lead compound, and a basic alkali earth metal compound.

8. A composition of matter comprising a rubber hydrochloride, a basic alkali earth metal compound, and a lead compound selected from the group consisting of lead oxide, lead carbonate, lead borate, lead linoleate, lead oleate, lead stearate, lead resinate, lead chloride, lead nitrate, lead sulphate, lead sulphide, lead sulphocyanate, lead silico fluoride, lead lactate, lead acetate, lead oxalate, lead tartrate, lead chromate and elemental lead.

9. A composition of matter comprising a rubber hydrohalide and litharge.

10. A plastic composition comprising as an essential ingredient a rubber hydrochloride intimately admixed with a minor proportion of a solid lead compound.

11. A plastic composition comprising as an essential ingredient a rubber hydrochloride intimately admixed with a minor proportion of lead oxide.

12. A plastic composition comprising as an essential ingredient a rubber hydrochloride intimately admixed with a minor proportion of a lead salt of a weak acid.

13. A plastic composition comprising as an essential ingredient a rubber hydrochloride intimately admixed with a minor proportion of lead sulphide.

14. A plastic composition comprising as an essential ingredient a rubber hydrochloride intimately admixed with a minor proportion of litharge.

HERBERT A. WINKELMANN.